(12) United States Patent
Hoelter et al.

(10) Patent No.: US 6,630,204 B2
(45) Date of Patent: Oct. 7, 2003

(54) COATING WITH FUNCTIONALIZED RUBBER, CROSSLINKER, ACCELERATOR/CATALYST AND VULCANIZER

(75) Inventors: Dirk Hoelter, Bendorf (DE); Thomas Burkhart, Montabaur (DE); Gerd Hessel, Oetzingen (DE)

(73) Assignee: SGL Acotec GmbH (DE)

( * ) Notice: Subject to any disclaimer, the term of this patent is extended or adjusted under 35 U.S.C. 154(b) by 0 days.

(21) Appl. No.: 09/861,030

(22) Filed: May 18, 2001

(65) Prior Publication Data

US 2002/0002244 A1 Jan. 3, 2002

(30) Foreign Application Priority Data

May 23, 2000 (DE) .......................................... 100 25 356

(51) Int. Cl.⁷ .......................... D05D 5/02; C08K 3/36; C08K 3/04; C08L 9/00; C08L 9/02

(52) U.S. Cl. .................... 427/385.5; 523/466; 523/468; 524/507; 524/513; 524/514; 524/517; 524/521; 524/522; 524/529; 524/533; 524/534; 524/535; 524/555; 524/558; 524/572; 427/386

(58) Field of Search .................................. 525/123, 126; 427/385.5, 386; 524/507, 513, 514, 517, 521, 522, 529, 533, 534, 535, 555, 558, 572; 523/466, 468

(56) References Cited

U.S. PATENT DOCUMENTS 3,674,743 A * 7/1972 Verdol et al.
3,900,532 A * 8/1975 Dietrich et al.
4,343,339 A * 8/1982 Schwindt et al. ........ 152/209 R
4,683,266 A * 7/1987 Palermo et al. .............. 525/123
5,149,742 A * 9/1992 Hemel et al. ................ 525/124
RE34,830 E * 1/1995 Satoji .......................... 252/12
6,015,860 A * 1/2000 Kuzumaki et al. .......... 525/123

FOREIGN PATENT DOCUMENTS

| DE | 37 40 181 | | 6/1989 |
| JP | 58-79036 A | * | 5/1983 |
| JP | 1-197517 A | * | 8/1989 |
| WO | WO 92/03514 A | * | 3/1992 |
| WO | WO98/22225 | | 5/1998 |

OTHER PUBLICATIONS

Oleg L. Figovsky, et al, (Proceedings of International Conference: Corrosion in Natural and Industrial Environments: Probelms and Solutions, Grado, 1995).

* cited by examiner

Primary Examiner—Robert E. L. Sellers
(74) Attorney, Agent, or Firm—Connolly Bove Lodge & Hutz LLP

(57) ABSTRACT

Mixtures containing at least one functionalized low-molecular rubber A, at least one cross-linking agent B having groups which are reactive with respect to the functional groups of the rubber A, accelerators/catalysts C for the cross-linking reaction between A and B, possibly reactive diluents D, vulcanization chemicals E, and also fillers F and auxiliary substances G, with at least one of the average functionalities of the constituents A and B being at least 2, and their use as anti-corrosive coating agents.

8 Claims, No Drawings

COATING WITH FUNCTIONALIZED RUBBER, CROSSLINKER, ACCELERATOR/CATALYST AND VULCANIZER

FIELD OF THE INVENTION

The invention relates to hard-rubber coatings for protection against corrosion.

BACKGROUND OF THE INVENTION

Hard-rubber coatings or rubberlinings have been used for decades as protection against corrosion for steel surfaces and concrete surfaces. For this purpose, unvulcanised or pre-vulcanised rubber sheets are traditionally glued on to the surface to be protected and subsequently, so far as required, vulcanised at an elevated temperature. With so-called factory rubberlinings, this last step takes place, as a rule, in an autoclave under excess pressure. A decisive cost factor in the case of this method is the high expenditure on time and work that is required for the lining of the often geometrically demanding structural components.

It is therefore desirable to find a system which can be applied by simple methods (such as spraying or rolling, for example) and, apart from this, does not have to rely on the additional use of adhesives.

For some years, so-called "liquid hard rubbers" with a content of low-molecular polybutadienes have been known, which, in contrast to conventional rubber mixtures, are viscous liquids. After vulcanisation, the coatings produced therewith have the properties of a hard rubber.

A system described in DE-A 37 40 181 is based on a low molecular 1,4-cis-polybutadiene, to which, in addition to fillers and vulcanisation chemicals, is also added a highly aromatized polybutadiene, partly in combination with a copolymer of isobutylene and isoprene, in order to improve resistance to chemicals and mechanical properties. A similar system, likewise based on linear 1,4-cis-polybutadiene, was described by O. Figovsky et al. (Proceedings of International Conference: Corrosion in Natural and Industrial Environments: Problems and Solutions, Grado, 1995).

The use of epoxidized low-molecular polybutadienes as a base for liquid hard rubbers is suggested in WO-A 98/22225. In this case, in addition to the vulcanisation process by means of sulphur, a cross-linking as a result of reaction of the epoxide groups with amines is also to take place. An improvement in the mechanical properties is achieved by the addition of a high-molecular butadiene-nitrile rubber.

The flow processes which occur during heating are a fundamental problem in the use of liquid rubbers. Above all in the case of comparatively thick layers, they lead to not yet cross-linked or vulcanised mixture running off non-horizontal surfaces. Mixtures described hitherto, which are adjusted by admixtures or other mixing ratios in such a way that this problem is slightly less pronounced, can be processed only with difficulty because of their high viscosity.

It is therefore the object of the present invention to make available a liquid hard-rubber coating agent which has a low viscosity suitable for spray application and which displays no run-off from non-horizontal walls, or as little run-off as possible, in the case of the subsequent heating required for vulcanisation.

SUMMARY OF THE INVENTION

Surprisingly, it has been discovered that this requirement can be fulfilled if a coating agent based on liquid rubbers, optionally in combination with a reactive diluent of low viscosity, is, immediately after application, solidified to such an extent as a result of a prepolymerization or pre-cross-linking preceding the vulcanisation that a run-off is substantially or completely prevented. In order to do this, functionalised rubbers are used having those reactive groups that react with an added chain extension agent or cross-linking agent, forming preferably covalent bonds, and thereby forming lengthened or branched molecules.

Therefore, mixtures containing the indicated mass fractions of the following constituents are the subject-matter of the invention:

| | |
|---|---|
| 10 to 90% | of at least one functionalised low-molecular rubber A, |
| 1 to 50% | of at least one cross-linking agent B for the functionalised rubber A, and optionally |
| 0.01 to 10% | accelerators/catalysts C for the pre-cross-linking reaction, |
| 0 to 60% | reactive diluents D, |
| 1 to 50% | vulcanisation chemicals E, |
| 5 to 50% | fillers F and optionally auxiliary substance G, | wherein the sum of the mass fractions in the mixture must always be 100%, and at least one of the average functionalities of the constituents A or B is at least 2. "Mass fraction" denotes the ratio of the mass of an individual component to the total mass.

Preferably, the mass fraction of A amounts to 15 to 60%, in particular 20 to 50%; that of the cross-linking agent B amounts to 1.5 to 45%, in particular 2 to 40%; that of the accelerators C amounts to 0.02 to 7%, in particular 0.05 to 5%; that of the reactive diluents D amounts to 2 to 55%, in particular 5 to 50%; that of the vulcanisation chemicals E amounts to 2 to 45%, in particular 5 to 40%, and finally the sum of the mass fractions of fillers and auxiliary substances F and G amounts to 7 to 45%, in particular 10 to 40%.

The presence of the cross-linking agent B is required for the pre-cross-linking or pre-polymerization (=chain lengthening) of the low-molecular rubber. The expression cross-linking agent is used in the following for reasons of simplification; in this connection, however, it can also be, in principle, a compound (chain-lengthening agent) which in combination with a rubber A leads only to the formation of a linear polymer.

The functionalised low-molecular rubber A and the cross-linking agent B for this rubber are contained separately from each other in different components of a two-component system, while the other constituents C to G can be distributed between the two components in any desired way. The accelerator C for the pre-cross-linking or the pre-polymerization is advantageously also separated from the cross-linking agent B if its stability is impaired thereby.

The functionalised low-molecular rubber A is preferably one or more of (co)polymerizates of monomers selected from doubly saturated or multiply unsaturated hydrocarbons, in which case singly olefinically unsaturated monomers, such as styrene, acrylic ester and acrylonitrile, for example, can additionally be present in the monomer mixture if appropriate. The rubbers A have olefinic double bonds along the main chain and/or in side chains, which double bonds are accessible to the usual vulcanisation with sulphur. Additionally, these functionalised low-molecular rubbers A also have reactive groups at the chain ends (terminal) and/or in side chains (lateral), which groups react with the cross-linker B forming oligomers or partially cross-linked systems. In this connection, the reactive groups of the cross-linking agent B are such that they react with the reactive groups of the rubber A, preferably forming covalent bonds. The functional groups of the low-molecular rubber A and those of the cross-linking agents B are therefore selected in each case from the group consisting of hydroxyl groups, epoxide groups, carboxylic acid anhydride groups, carboxyl groups, amine groups and isocyanate groups, and A and B are combined in such a way that upon the reaction of A and B, their functional groups react, forming a urethane bond —NR—CO—O—, an ester bond —CO—O—, a urea bond —NR—CO—NR—, a β-hydroxyamine bond —CR(OH)—NR—, or an acid amide bond —CO—NR—. The radical R in these formulae can be the same or different and signify hydrogen, linear, branched or cyclic aliphatic radicals with preferably 1 to 20 carbon atoms or aromatic radicals with preferably 5 to 16 carbon atoms.

In this connection, those mixtures in which the rubber A is hydroxy-functional and the cross-linking agents B have functional groups selected from isocyanate groups, acid anhydride groups and epoxide groups are preferred.

It is advantageous that the average functionality of the rubbers A is 1.5 to 5.5 and that the average functionality of the cross-linking agents B is 5.0 to 1.9. In particular, those combinations in which the average functionality of A is 1.8 to 2.3 and that of the cross-linking agents B is 4 to 2.0 are advantageous. By "functionality" is understood here and in the following the (average) number of the functional groups in one (polymer) molecule.

The reaction which starts immediately after the mixing of A and B or after heating of the mixtures of A and B and also the further additives that have been applied to the substrate, effects an increase in viscosity by a factor of at least 3, preferably to more than the 10-fold, with respect to the mixture which has not yet reacted. This can be shown, for example, by putting the mixture in a rotation viscosimeter and recording the viscosity as a function of the time (and optionally of the temperature).

The low-molecular rubbers A are preferably selected from the group consisting of polybutadiene, polyisoprene, polybutadiene copolymers (for example copolymers of 1,4-butadiene with styrene or acrylonitrile) or polyisoprene copolymers, which are functionalised with reactive groups such as hydroxyl groups, epoxide groups, carboxylic-acid anhydride groups, carboxyl groups, amino groups, isocyanate groups or a combination of these. On average, there are more than one, preferably two or more functional groups per molecule (in the case of the amines and carboxylic-acid anhydride groups, this relates to the —N—H— group and —COOH— group respectively, a primary amine thus producing two reactive —N—H— groups and a carboxylic-acid anhydride group producing two reactive acid groups).

The polybutadiene or polybutadiene copolymers can be either linear or branched polymers. The proportion of 1,4-trans-, 1,4-cis- and vinyl configuration in the butadiene units can vary and offers an additional possibility of controlling the viscosity of the polymer and the properties of the (vulcanised) end product. The polyisoprene or polyisoprene copolymer can be either linear or branched polymers. The proportion of 1,4-trans- or 1,4-cis-configuration in the isoprene units can vary. In all of the above-mentioned rubbers, the preferred number average molar mass ($M_n$) lies between 500 and 10,000 g/mol. The functionalised polybutadienes, polyisoprenes, butadiene copolymers and isoprene copolymers which are used can also be hydrogenated or partially hydrogenated.

Particularly preferred are mixtures in which a homopolymer or copolymer of butadiene or isoprene with functional groups selected from hydroxyl groups, carboxylic-acid anhydride groups and epoxide groups is used as the rubber A.

In another preferred variant, the rubber A is selected from the group consisting of partially hydrogenated polybutadiene, partially hydrogenated copolymers of butadiene, partially hydrogenated polyisoprene, partially hydrogenated copolymers of isoprene, with functional groups selected from hydroxyl groups, carboxylic-acid anhydride groups and epoxide groups.

Also suitable, for example, are functionalised low-molecular butyl rubbers, bromobutyl rubbers, chlorobutyl rubbers, polyocteneamers or EPDM rubbers.

All of these rubbers are used alone or also in combination with each other, provided that the combination does not lead to an unwanted pre-cross-linking.

The cross-linking agents B for the functionalised rubber are compounds which are functionalised with
hydroxyl groups (B1) or
epoxide groups (B2) or
carboxylic-acid anhydride groups (B3) or
carboxyl groups (B4) or
amine groups (B5) or
isocyanate groups (B6)
or a combination of these (in so far as the different reactive groups do not already react with each other). On average, there are more than one, preferably two or more functional groups per molecule (in the case of the amines and carboxylic-acid anhydride groups, this relates, as explained above, to the —N—H— group and —COOH— group respectively). The cross-linking agents can also be polymeric or oligomeric compounds. The decisive factor is that the cross-linking agent can enter into a reaction with the functional groups of the low-molecular rubber, which reaction leads either to the formation of a three-dimensional network or to the formation of a polymer with a viscosity which is clearly increased with respect to the mixture of the educts (A and B).

The cross-linking agent B can also be a mixture of different suitable compounds. Polymeric cross-linking agents B might, for example, be chosen from the above-described functionalised rubbers, which can enter into a reaction with functionalised rubbers A, in which case the functional groups of B and A must be chosen in such a way that the two kinds can react with each other (for example, functional groups of A are epoxide groups and the functional groups of B are amino groups; or a hydroxy-functionalised polybutadiene as low-molecular rubber A and a maleinated polybutadiene as cross-linking agent B or vice versa).

All alcohols which contain more than one hydroxyl group per molecule are suitable hydroxyl-group-containing cross-linking agents B1. They can be both saturated and unsaturated, as well as aliphatic, cycloaliphatic, polycyclic, aromatic or heterocyclic and can also additionally have other functional groups, such as amino groups, for example. Polymers which contain terminal or lateral hydroxyl groups, such as polyglycol ether, polyester, copolymers of hydroxyl-functionalised methacrylates or acrylates, copolymers of hydroxyl-functionalised olefines, hydroxyl-functionalised rubbers or hydroxyl-functionalised polyolefines, for example, are also mentioned among these compounds. The polymers can have a linear, branched, hyper-branched or dendritic structure.

Examples of polyhydric alcohols are 1,2-dihydroxyethane, 1,2-dihydroxypropane, 1,3- dihydroxypropane, 1,4-dihydroxybutane, 1,5-dihydroxypentane, neopentyl glycol, 1,6-dihydroxyhexane, 4,8-bis-(hydroxymethyl)-tricyclo[5.2.1.0$^{2,6}$]decane, 1,4-dihydroxycyclohexane, diethylene glycol, dipropylene glycol, higher polyoxyalkylene glycols, glycerine, trimethylol propane, trimethylol ethane, pentaerythritol, sorbitol, oxalkylated polyols (such as oxalkylated trimethylol propane, oxalkylated pentaerythritol, among others, which can be obtained by reacting polyols with 1,2-epoxy alkanes in a known manner), cyclohexane dimethanol, bis-(4-hydroxycyclohexyl)methane, bis-(4-hydroxycyclohexyl) propane, N-methyldiethanolamine, N-butyldiethanolamine, N,N-(dihydroxyethyl)aniline, N,N-bis-(hydroxyethyl) toluidine, 1,4-bis-(hydroxyethyl)piperazine, triethanolamine or triisopropanolamine. The alcohols can be used both in pure form and in the form of mixtures.

All epoxide resins which contain more than one epoxide group per molecule can be used as epoxide-functional cross-linking agents B2. They can be both saturated and unsaturated, as well as aliphatic, cycloaliphatic, aromatic or heterocyclic and can also have other functional groups, such as hydroxyl groups, for example. Suitable epoxide resins are, for example, those which are obtained from diphenylol alkanes or higher polyphenylol alkanes, such as novolaks and epichlorohydrin or dihalohydrins, preferably epichlorohydrin, by the so-called Taffy reaction. The known epoxide resins based on bisphenol A or bisphenol F, in particular liquid resins, or mixtures thereof, are particularly preferred. Apart from this, those epoxide resins which are produced by reaction of epihalohydrins with polyhydric alcohols or polyether glycols (for example epoxide resins derived from polypropylene glycols) or by epoxidation of double-bond-containing compounds, for example by epoxidation of unsaturated fatty oils or unsaturated hydrocarbons such as dicyclopentadiene, butadiene, polybutadiene etc, can be used. Furthermore, poly-(N-glycidyl) compounds come into question, which compounds can be obtained by dehydrohalogenation of the reaction products of epichlorohydrin and aliphatic, araliphatic or aromatic mono-functional or poly-functional primary amines. Likewise, those compounds which are derived from isocyanuric acid, from cyclic ureas or from aminoplast formers such as melamine or guanamines are also mentioned among the poly-(N-glycidyl) compounds. Apart from this there can also be used polyglycidyl esters or polycarboxylic acids, which are obtained by reacting epichlorohydrin or similar epoxide compounds with aliphatic, cycloaliphatic or aromatic polycarboxylic acids. Further suitable compounds are glycidyl-ester-group-containing copolymers, which are obtained by copolymerization of, for example, glycidyl methacrylate with other methacrylic-acid esters or acrylic-acid esters or by copolymerization with styrene. Adducts of an epoxy resin with an amine or amino-functionalised oligomer or polymer are also suitable. The epoxides can be used both in pure form and also in the form of mixtures.

All carboxylic-acid anhydrides which are derived from dibasic or polybasic carboxylic acids are suitable carboxylic-acid-anhydride-functional cross-linking agents B3. They can be both saturated and unsaturated, as well as aliphatic, cycloaliphatic, aromatic or heterocyclic and can also additionally have other functional groups. Polymers which contain terminal or lateral carboxylic-acid anhydride groups, such as maleinated rubbers, maleinated oils or fats or maleinated polyolefines, for example, are also mentioned among these compounds. The polymers can have a linear, branched, hyper-branched (with branches on lateral branches) or dendritic structure. Examples of carboxylic acid anhydrides which can be used are hexahydrophthalic acid anhydride, phthalic acid anhydride, trimellitic acid anhydride, dodecenyl succinic acid anhydride, methylnorbonene dicarboxylic acid anhydride, anhydrides of other carboxylic acids listed under B4 or maleinated polybutadiene or maleinated polybutadiene copolymers. The carboxylic acid anhydrides can be used both in pure form and also in the form of mixtures.

All carboxylic acids which contain more than one carboxyl group per molecule can be used as carboxyl-functional cross-linking agents B4. They can be both saturated and unsaturated, as well as aliphatic, cycloaliphatic, aromatic or heterocyclic and can also have other functional groups, such as hydroxyl groups, for example. Polymers which contain terminal or lateral carboxyl groups, such as polyesters, polyamides, polymers or copolymers of acrylic acid, polymers or copolymers of methacrylic acid, carboxyl-functionalised rubbers or carboxyl-functionalised polyolefines are also mentioned among these compounds. The polymers can have a linear, branched, hyper-branched or dendritic structure.

Alkane diacids such as malonic acid, succinic acid, glutaric acid, adipic acid, pimelic acid, suberic acid, azelaic acid or sebacic acid, and phthalic acid, terephthalic acid, isophthalic acid, cyclohexane dicarboxylic acid, tetrahydrophthalic acid, maleic acid, tartaric acid, trimesic acid or trimellitic acid, for example, can be used. The carboxylic acids can be used both in pure form and also in the form of mixtures.

All amines which contain more than one N—H— functionality per molecule are suitable amino-functional cross-linking agents B5. They can be both saturated and unsaturated, as well as aliphatic, cycloaliphatic, aromatic or heterocyclic and can also have other functional groups, such as hydroxyl groups, for example. Polymers which contain terminal or lateral amino groups, such as polyamides, polyamidoamines, polyalkylene amines or copolymers of amino-functionalised acrylates or methacrylates, for example, are also mentioned among these compounds. The polymers can have a linear, branched, hyper-branched or dendritic structure.

Examples of amines which can be used are methylamine, ethylamine, propylamine, butylamine, hexylamine, octylamine, tridecylamine, isopropylamine, sec.-butylamine, tert.-butylamine, 2-ethylhexylamine, trimethylhexamethylenediamine, cyclopentylamine, cyclohexylamine, 2-phenylethylamine, 1-phenylethylamine, benzylamine, m-xylylenediamine, aniline, toluidine, xylidine, ethoxyethylamine, ethoxypropylamine, methoxyethylamine, 3-(2-ethylethoxy)propylamine, (methoxyethoxy)propylamine, ethylenediamine, 1,3-propanediamine, 1,4-diaminobutane, hexamethylenediamine, 1,2-propanediamine, neopentanediamine, methylpropanediamine, diaminodicyclohexylmethane, dimethyldiaminodicyclohexylamine, diaminodiphenylmethane, isophoronediamine, 3-(cyclohexylamino) propylamine, piperazine, 1-diethylamino-4-aminopentane, 2-(diethylamino)-4-aminopentane, 3-(diethanolamino)propylamine, 3-(dimethylamino)propylamine, N-(2-aminoethyl) morpholine, 1,12-diamino-4,9-dioxadodecane, 1,13-diamino-4,7,10-trioxatridecane, polyetheramines derived from polyethylene glycol or polypropylene glycol as well as mixed polymers thereof, diethylenetriamine, dipropylenetriamine, N-(2-aminoethyl)piperazine, N-(3-aminopropyl)-N-methylpropanediamine, N,N- dimethyldipropylenetriamine. Polynuclear amines which are derived from diaminodicyclohexylmethane or diaminodiphenylmethane, polyamidoamines based on diethylenetriamine or similar amines and fatty acids, amine-epoxide-resin adducts or polyamide-epoxide-resin adducts, for example, can also be used. Examples of suitable amines with hydroxyl groups are 2-aminoethanol, 2-aminopropanol, aminopentanol, isopropanolamine, (aminoethoxy)ethanol, (aminoethyl)ethanolamine, N-ethylethanolamine, N-butylethanolamine, N-(2-hydroxyethyl)aniline, 1-(2-hydroxyethyl)piperazine, N-(2-hydroxyethyl)propane-1,3-diamine, diethanolamine, diisopropanolamine, and 3-(2-hydroxyethylamino)-1-propanol. The amines can be used both in pure form and also in the form of mixtures.

All aliphatic, aromatic, cycloaliphatic or mixed aromatic-aliphatic isocyanates with more than one isocyanate group per molecule are suitable as isocyanate-functional cross-linking agents B6. m-Phenylene diisocyanate, 2,4-toluylene diisocyanate, 2,6-toluylene diisocyanate, mixtures of 2,4- and 2,6-toluylene diisocyanate (TDI), hexamethylene diisocyanate (HDI), tetramethylene diisocyanate, trimethylhexamethylene diisocyanate, cyclohexane-1,4-diisocyanate, isophorone diisocyanate, dicyclohexylmethane diisocyanate ($H_{12}$-MDI), tetramethylxylylene diisocyanate (TMXDI), naphthalene-1,5-diisocyanate or 4,4'-diphenylmethane diisocyanate (MDI), for example, can be used. Furthermore, all isocyanurates, polyisocyanurates, polyisocyanates, prepolymers, biurets, uretdiones and adducts which contain isocyanate groups or were produced on the basis of isocyanates such as the ones mentioned above can also be used. The isocyanates can be used both in pure form and also in the form of mixtures.

The pre-cross-linking reaction can be accelerated by suitable accelerators or catalysts C. The selection of the accelerators or catalysts which are used is directed according to the type of the pre-cross-linking reaction.

All accelerators which are used in the conversion of epoxides or a mixture of these are suitable accelerators for the pre-cross-linking by way of epoxide groups. These preferably include tertiary amines and imidazoles such as, for example, dimethylbenzylamine, dimethylcyclohexylamine, monoethanoldimethylamine, triethanolamine, trimethylaminoethylamine, tetramethylethylenediamine, Mannich bases (for example of phenol, dimethylamine and formaldehyde), 1-methylimidazole, 2-methylimidazole, 2-ethyl-4-methylimidazole, 2-phenylimidazole or N-alkylpiperidine. However, hydrogen donors such as salicylic acid or benzyl alcohol can also be used.

All catalysts which are used in the preparation of polyurethanes or a mixture of these are suitable catalysts for the additive reaction of the isocyanates. These include tertiary aliphatic, cycloaliphatic or mixed aromatic-aliphatic amines and organometallic compounds such as, for example, triethylenediamine, N-methyl morpholine, N-ethyl morpholine, diethyl ethanolamine, 1-methyl-4-dimethylaminoethylpiperazine, bis-(N,N-dimethylaminoethyl)ether, 3-methoxypropyldimethylamine, N,N,N'-trimethyl-N'-isopropylpropylenediamine, 3-diethylaminopropyldiethylamine, dimethylbenzylamine, as well as organic compounds of lead, iron, mercury, titanium, bismuth and tin.

All accelerators which find use in the conversion of carboxylic-acid anhydrides or a mixture of these are suitable accelerators for the pre-cross-linking by way of carboxylic-acid anhydride groups. These include, for example, tertiary amines and imidazoles, as are also used for the conversion of the isocyanate and epoxide groups, secondary amines such as dimethylamine, diethylamine or n-dibutylamine, as well as organic acids such as p-toluene sulphonic acid or alkylbenzene sulphonic acid.

The reactive diluents D are preferably compounds of low viscosity (i.e. with dynamic viscosities of 2 Pa·s or below), which, upon vulcanisation at the latest, are bound into structures which are preferably polymeric and are not capable of migration. However, it is also possible that the compounds already react fully or partially with the cross-linking agent B or the liquid rubber A before the vulcanisation.

These reactive diluents can also be substances which are crystalline at room temperature, which dissolve in the overall mixture and thus effect a lowering of the viscosity. In this connection, the olefinically unsaturated compounds which contain one or more double bonds, such as, for example, styrene and its derivatives (for example vinyl toluene, divinyl benzene), unsaturated (cyclic) aliphatics (for example cyclododecatriene, terpenes, dicyclopentadiene), low-molecular rubbers (for example low-molecular polybutadienes or polybutadiene copolymers or polyisoprenes or polyisoprene copolymers preferably with a number average molar mass $M_n$ of between 500 and 3000 g/mol), low-molecular acrylates or methacrylates (for example trimethylolpropane trimethacrylate, diurethane dimethacrylate, butanediol dimethacrylate, hexanediol dimethacrylate, dodecanediol dimethacrylate, glycerine di- and trimethacrylate, ethylene glycol dimethacrylate, diethylene glycol dimethacrylate, triethylene glycol dimethacrylate, tetraethylene glycol dimethacrylate, n-butyl methacrylate, i-butyl methacrylate, n-hexyl methacrylate, cyclohexyl methacrylate, 2-ethylhexyl methacrylate, isobornyl methacrylate, benzyl methacrylate, tetrahydrofurfuryl methacrylate, methacrylic acid ester of longer-chained aliphatic alcohols with 7 to 40 carbon atoms, hydroxyl-functionalised methacrylates, amine-functionalised methacrylates, as well as the corresponding acrylates), allyl esters (for example diallyl diglycol carbonate, diallyl phthalate, diallyl isophthalate, triallyl cyanurate) or allyl ethers of monohydric or polyhydric aliphatic alcohols with 2 to 40 carbon atoms form an important group of compounds which can be used.

Epoxy resins of low viscosity can also be used, such as, for example, butanediol diglycidyl ether, hexanediol diglycidyl ether, 2,4-epoxycyclohexane carboxylic-acid-3',4'-epoxycyclohexylmethyl ester, bis-(3,4-epoxycyclohexylmethyl)-adipate), N,N-diglycidyl aniline, p-tert.-butylphenol glycidyl ethers or longer-chained aliphatic glycidyl ether resins. Furthermore, polyvalent alcohols or amines can also be used as reactive diluents, such as for example, are also listed as cross-linking agents B1 and B5.

The different compounds can be used both individually and in a mixture with each other as reactive diluent. The precise amount and composition of the reactive diluent is chosen according to the desired viscosity of the mixture, the required properties of the vulcanisate and the functional groups of the rubbers A of low viscosity and of the cross-linking agents B. Large amounts of reactive diluents lead to a very low viscosity, but can clearly impair the mechanical properties of the vulcanisate. On the other hand, the addition of the correct amounts of reactive diluent lead, in addition to a lowering of the viscosity, also to an improvement of the chemical and mechanical properties. The amounts used depend on the system of rubber and reactive diluent that is chosen in each case.

In the case of rubbers which are cross-linked by way of olefinic double bonds, the vulcanisation chemicals E are sulphur and/or one or more vulcanisation accelerators or activators, as also used in the production and vulcanisation of conventional rubber webs. Examples are thiazolesulphenamides, thiurams, dithiocarbamates, guanidines, metal oxides (preferably zinc oxide), stearic acid or stearate of zinc. The use of phenolic resins is also possible, however.

If double-bond-free rubbers such as silicone rubber, EPM-rubber, acrylic rubber, CSM (chlorosulphonated polyethylene) are used, then peroxides or metal oxides such as MgO or ZnO are used as vulcanisation agents.

Suitable, in general, as fillers F, are all substances which are also used for this purpose in conventional rubber mixtures and all mixtures of these. These are, above all, carbon blacks, coal dust, graphite, hard-rubber dust, silicic acids (with and without surface modification), polymer powders (for example PE, PP, PVC, PS, PTFE, solid-rubber powders or dispersions) or barium sulphate. However, fillers and pigments which are usually used in the field of coatings, such as layer silicates, glass flakes, organic and inorganic fibres, or even solid resins such as cyclic rubber, for example, can also be used.

Those mineral fillers or pigments which give the composition blocking-layer properties are particularly suitable. These are, in particular, plate-like (oblate) mineral fillers and pigments, such as, for example, layer silicates (talcum, mica, pyrophyllite), graphite, glass flakes, micaceous iron ore (haematite) and phthalocyanine pigments. If such pigments are used in the compositions in accordance with the invention, the diffusion at right angles to the layers formed from these fillers is impeded. With the same mass fraction of filler, compositions modified in this way display better resistance to chemicals than those with fillers, the shape of which is more spherical (globulate) or prolate (cigar-shaped).

Furthermore, auxiliary substances G can be used, the composition of which is selected according to the other constituents. Antioxidants, stabilisers (for example for PVC fillers or reactive diluents), de-aerators or adhesion promoters, for example, are mentioned among the auxiliary substances.

The mixing of the individual constituents of a component can take place by way of a mixing unit such as a dissolver, for example.

Advantageously, the two components of the two-component system are not added together and mixed with each other until shortly before or during application. The pot life depends substantially on the accelerators which are added. The mixing during application can preferably take place by means of simultaneous spraying of the two components via separate nozzles or combining nozzles. In the case of this type of application, there is no problem because of short pot life.

As a result of the application of the above-described mixtures on to substrates and subsequent pre-cross-linking (rise in viscosity) and finally vulcanisation, the substrates can be coated in a simple way, even in the case of complicated geometries, and protected against corrosive influences.

Particularly advantageous is a method for the coating of substrates, in which the above-described mixtures are applied to the surface of the substrates and in the first step, as a result of reaction of the component A with the component B, as a result of a suitable selection of the type and amount of the components in the mixture and selection of the temperature, the viscosity of the coating agent is increased within a short time, a maximum of 30 minutes, to at least the three-fold value, and subsequently the viscous coating is vulcanised by heating to a temperature of 120° C. to 160° C. If, for example, vessels or tanks are coated from the inside in this way, the layer which is applied does not run off from the perpendicular surfaces and also does not run off from overhanging surfaces.

A method in which the coating agent is applied with a two-component nozzle, one of the components being free of amounts of the rubber A and the other component being free of amounts of the cross-linking agent B, has proven particularly advantageous. Application by means of painting, rolling, casting, immersion or application by means of a spatula is also possible, however.

After the pre-cross-linking or pre-polymerization, the rubber coating layer, in the case of suitable adjustment (i.e. mass fraction of rubber preferably more than approximately 50%, depending on the type and amount of a reactive diluent which is possibly used), can be mechanically loaded, or even walked on, to a limited extent. This facilitates, for example, the application of a further layer. The time required depends on the combination of the components A and B, type and amount of the further additives and the temperature selected for the pre-cross-linking and the wet-film layer thickness, with suitable selection of the materials or mixtures of A and B and use of catalysts or accelerators for the reaction of the two component or mixtures, in the case of a wet-film layer thickness of approximately 750 $\mu$m or above and a temperature of up to 60° C., there is already no run-off from vertical walls after only a few minutes.

The vulcanisation of the rubber coatings can be carried out both at normal pressure and also under elevated pressure. Elevated pressure is recommended for completely pore-free coatings. Ideal vulcanisation temperatures lie between 120 and 160° C. In this connection, a completed pre-cross-linking is not absolutely a prerequisite for avoiding a run-off from inclined surfaces during the vulcanisation process. Heating to the vulcanisation temperature that is not too fast is generally sufficient, because the corresponding reactions that lead to the increase in viscosity or cross-linking are also accelerated by the rise in temperature.

A further subject of the invention is the use of the above-mentioned formulations for protection against corrosion, predominantly the corrosion-resistant lining of a structural component consisting of a metal, in particular steel, such as containers, pipelines or suchlike, in which the hard-rubber coating is applied to the exposed surface of the structural component. These can be components in rubbish incineration plants, sewage treatment plants, process containers, supply containers and storage containers in the chemical industry as well as various structural steel elements in different branches of industry.

The following examples explain the invention:

EXAMPLE 1

150 g of a hydroxy-terminated low-molecular polybutadiene (®Poly bd R 45 HT ex Elf-Atochem) were stirred with 75 g of divinyl benzene, 66 g of furnace black, 75 g of sulphur, 4.5 g of thiazolesulphenamide, 1 g of tetramethylthiuram disulphide, 1 g of a zeolite powder (®Baylith-T, Bayer AG), 5 g of powdered polytetrafluoroethylene and 0.8 g of ®Desmorapid PP (tertiary amine, Bayer AG) by means of a high-speed stirrer for 30 minutes to form a homogeneous mixture.

80 g of this mixture were stirred with 3.53 g of a polyfunctional isocyanate (®Desmodur VL, monomer/oligomer mixture of bis(4-isocyanatophenyl)methane, Bayer AG) and the resulting mixture was poured into moulds, from which test pieces for carrying out the necessary tests were obtained.

In the case of a layer thickness in the mould of approximately 1000 μm and at room temperature (23° C.), there is no longer any run-off after 5 minutes when the mould is placed upright.

The subsequent vulcanisation took place over 4.5 hours at 150° C. and normal pressure.

The hard rubber obtained in this way has the following properties:

| tensile strength: | 36 MPa (=N/mm$^2$) |
|---|---|
| elongation at break: | 4.6% |
| glass transition temperature: | 40° C. |
| hardness (Shore D): | 75 |

EXAMPLE 2

85 g of a hydroxyl-terminated low-molecular polybutadiene (®Poly bd R 45 HT ex Elf-Atochem) was stirred with 60 g of a low-molecular polybutadiene ($M_n$=approximately 800 g/mol), 20 g of furnace black, 80 g of quartz powder, 70 g of sulphur, 4.5 g of thiazole sulphenamide, 1 g of tetramethylthiuram disulphide and 0.4 g of ®Desmorapid PP (tertiary amine, Bayer AG) by using a high-speed stirrer for 30 minutes to form a homogeneous mixture.

80 g of this mixture was stirred with a mixture of 9 g of a polyfunctional isocyanate (®Desmodur VL, monomer/oligomer mixture of bis (4-isocyanatophenyl)methane, Bayer AG), 35 g of a maleinated low-molecular polybutadiene (®Polyvest OC 800 S, Degussa-Hüls), 20 g of a low-molecular polybutadiene ($M_n$=approximately 800 g/mol) and 1 g of a zeolite powder (®Baylith-T, Bayer AG), and the resulting mixture was poured into moulds, from which test pieces for carrying out the necessary tests were obtained.

In the case of a layer thickness in the mould of approximately 1000 μm and at room temperature (23° C.), there is no longer any run-off after 5 minutes when the mould is placed upright.

The subsequent vulcanisation took place over 4.5 hours at 140° C. and 4·10$^5$ Pa (0.4 MPa, 4 bar) pressure. The hard rubber obtained in this way has the following properties:

| tensile strength: | 32 MPa (=N/mm$^2$) |
|---|---|
| elongation at break: | 1.5% |
| glass transition temperature: | 53° C. |
| hardness (Shore D): | 79 |

What is claimed is:

1. A method of applying a coating to a substrate, comprising the steps of
   a) mixing mass fractions of the following constituents to form a mixture:

| | |
|---|---|
| 20 to 90% | of at least one functionalised low-molecular rubber A, with functional reactive groups selected from the group consisting of hydroxyl groups, carboxylic acid anhydride groups, carboxylic groups, amine groups and isocyanate groups |
| 2 to 50% | of at least one cross-linking agent B with functional reactive groups selected from the group consisting of hydroxyl groups, carboxylic acid anhydride groups, carboxyl groups, amine groups and isocyanate groups, with the proviso that the functional reactive groups of the rubber A and those of the cross-linking agent B are chosen in such way that by reaction of these, there is formed a bond selected from the group consisting of a urethane bond, an ester bond, a urea bond, and an acid amine bond, |
| 0.01 to 10% | accelerators or catalysts C for the pre-cross-linking reaction between A and B, |
| 0 to 60% | reactive diluents D, |
| 1 to 50% | vulcanisation chemicals E, |
| 5 to 50% | fillers F and auxiliary substances G, | wherein the sum of the mass fractions in the said mixture must always be 100%, and wherein at least one of the average functionalities of the constituents A or B is at least 2, b) applying the said mixture to a substrate, wherein, as a result of reaction of the component A with the component B, the viscosity of the said mixture is increased within 30 minutes to at least the three-fold value, and
   c) heating the coated substrate to effect vulcanisation.

2. The method of claim 1, wherein the average functionality of A is 1.5 to 5.0, and wherein the average functionality of the cross-linking agent B is 5.0 to 1.9.

3. The method of claim 1, wherein the rubber A is hydroxy-functional and the cross-linking agents B have functional reactive groups selected from the group consisting of isocyanate groups, and acid anhydride groups.

4. The method of claim 1, wherein a homopolymer or copolymer of butadiene or isoprene with functional reactive groups selected from the group consisting of hydroxyl groups, and acid anhydride groups is used as the rubber A.

5. The method of claim 4, wherein the homopolymer or copolymer has a number average molar mass $M_n$ of between 500 and 10,000 g/mol.

6. The method of claim 1, wherein a rubber selected from the group consisting of partially hydrogenated polybutadiene, partially hydrogenated copolymers of butadiene, partially hydrogenated polyisoprenes, partially hydrogenated copolymers of isoprene, with functional reactive groups selected from the group consisting of hydroxyl groups, and acid anhydride groups is used as the rubber A.

7. The method of claim 1, wherein plate-like mineral fillers or pigments F are used.

8. A coating prepared by applying the method of claim 1.

* * * * *